(No Model.)
R. d'HEUREUSE.
APPARATUS FOR PURIFYING WATER.
No. 302,326. Patented July 22, 1884.
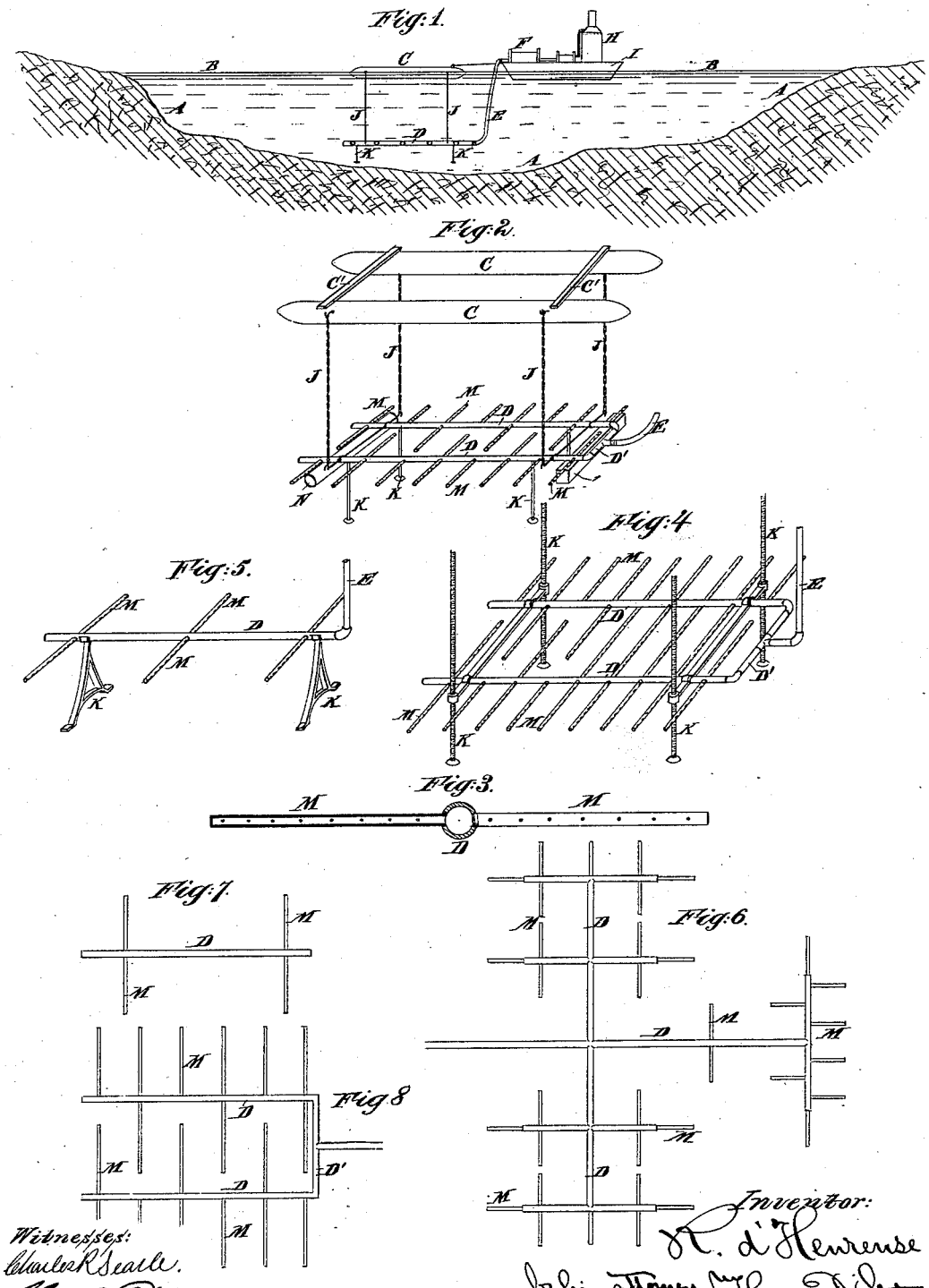

UNITED STATES PATENT OFFICE.

RUDOLPH D'HEUREUSE, OF NEW YORK, N. Y.

APPARATUS FOR PURIFYING WATER.

SPECIFICATION forming part of Letters Patent No. 302,326, dated July 22, 1884.

Application filed September 17, 1883. (No model.)

*To all whom it may concern:*

Be it known that I, RUDOLPH D'HEUREUSE, a citizen of the United States, residing at New York city, in the county and State of New York, have invented certain new and useful Improvements in Means for Purifying Water by Aeration, of which the following is a specification.

The invention is applicable to reservoirs in which water is stored or through which it passes, and to ponds, large tanks, and lakes the water in which requires purification or means to prevent deterioration by the presence of polluting organic matter therein.

This invention consists in stationing a series or system of pipes with perforated branch pipes at a uniform level below the surface of the water and at the most suitable place or places of the reservoir, or to have such pipe system attached to a floating frame or float which is moved along in the pond, lake, or reservoir to be operated upon, the pipe system in either case connected directly or indirectly with an air-forcing device ashore or afloat by pipes which may be, according to circumstances, flexible or stationary.

The object of this device is to introduce minutely-divided air to every part of the water requiring the purifying action. By reason of the oxygen in the rapidly-moving air the organic matter in the water is oxidized and destroyed.

In the annexed drawings simple means of carrying out the invention are represented, and various modifications in construction of the device are shown.

Figure 1 is a vertical section of the device, every part thereof being afloat. Fig. 2 is a perspective view on a larger scale, showing the system of horizontal and perforated pipes, with a part of a pipe which conveys the compressed air from the air-pumps or analogous air-forcing device, or from an intermediate air-chamber, to be presently described. The remaining figures represent modifications. Many other variations of the form may be given to the system or series of perforated pipes. Fig. 3 is a cross-section through one of the horizontal plane pipes, taken in the plane of and through one of the perforated branch pipes. Fig. 4 represents a modification in which a similar arrangement of the two parallel pipes connected by a transverse pipe on one end is supported on legs resting on the bottom. These legs are here indicated screw-threaded for adjusting each portion as required, and may be operated from the top of the water. Many other means of adjusting the pipe system at the proper level may serve well. The remaining figures, representing further modifications, will be described further on.

Similar letters of reference indicate corresponding parts in all the figures where they occur.

Referring to Fig. 1, A is the bottom and sides of a basin, pond, or reservoir of water. B is the water-surface line. C is a float or series of floats of wood, cork, or other light material; or each may be a boat or hollow vessel of metal or other suitable material. D is a pipe or series of pipes of suitable material, to which is connected an air-supply pipe, E, leading directly or by way of an air-chamber to the air-force pump F, operated by any convenient power, as steam, a boiler, H, for supplying a steam-engine being indicated. The whole of the air-supply mechanism is here represented to be supported in a sufficient boat or vessel, I. J J are chains or ties connecting the boat or floats C with the pipe or pipes D. K K are sufficiently stout legs extending downward from the pipe or pipes D, adapted to rest on the bottom of the tank or reservoir to hold up the pipe or pipes D, should this be deemed desirable, though not always necessary.

Fig. 2 shows two floats connected by rigid cross-bars C'. This figure also shows two of the pipes D connected by a cross-pipe, D', to which the air-supply pipe E is connected. M M are branch pipes having their outer ends closed and connected at their inner ends to the pipes D, and are preferably made of material which resists oxidation to a considerable extent. These perforated branch pipes may, however, connect at each end with one of the parallel pipes D. The several branch pipes M are provided with fine perforations, through which the air, under pressure, received through pipe E is allowed to escape in as minute bubbles as possible and to rise through the water to the surface. To obtain the greatest effect it is always of advantage to arrange the perforated pipes as near the bottom as compatible with other requirements, for the air-bubbles before reaching the surface of the water have then occasion to come into contact and exercise the oxidizing action of their oxygen upon more particles of water than if arranged nearer the surface. The perforations m are preferably as small as can be practically made and sustained in the material used in the perforated pipes to subdivide the air passing through them as minutely as possible. Large perforations involve useless waste of air or of power to supply it, and for that reason are not advisable. The smaller the holes the greater the effect from the same amount of air. The perforated pipes M in any one series or system of pipes are arranged or adjusted to bring them into practically as nearly as possible the same level, thereby to insure a uniform emission of air from the several perforations against an equal pressure of the water. Chains may be used to advantage to suspend the pipes D and connections to the float or floats C, as chains can be readily taken up and let out for adjustment; but under some circumstances rods, straps, ropes, &c., may be preferable for the purpose.

Parts of the hereinbefore-described invention may be used successfully without the whole.

Fig. 4 has been before briefly described. The two parallel pipes D and their connecting-pipes D', with their several branches M, correspond with the construction shown in Fig. 2; but the float is omitted and the legs are adjustable.

Fig. 5 shows a modification, of which two floats and the means of attaching the perforated pipes thereto are omitted. In this only a single pipe D with six branches, M, are connected to the air-pipe E. A pair of stands serve as legs to support the pipe D in its required level position.

Fig. 6 shows one principal pipe D crossed by another, and both of these again by others, which are finally provided with perforated branches M. The subdivision or rebranching of the several pipes may be carried to any required extent.

Fig. 7 shows a very simple form, one pipe D with four branches M.

Fig. 8 is a plan view corresponding to Figs. 2 and 3. I propose to employ this invention not only to purify water for the supply of towns and houses, but to prevent putrescence of the water by stagnation in ponds, lakes, or tanks. In either of these cases the device, when floating, may be moved successfully into different parts of the water by any convenient means; but where the water is flowing or passing into and through a reservoir, I station the device near the place where the water flows in, so that the deposition of the sediment can take place before the water reaches its exit from the reservoir, freed of its excess of organic matter it may have contained before and of much of the sedimentary matter it carried.

In large reservoirs storing several days' supply of water, in which time new contamination may occur, several pipe systems at intervals may be employed to counteract the contamination. Usually the power for and the air-forcing device for purifying water in reservoirs may be stationary. The air from the air-pump or analogous device may be conducted directly to the pipe system, or indirectly by way of an air-chamber to contain a considerable quantity of compressed air. The question of the power and means employed to impel the air is simply one of expediency. Steam, wind, animal, water, or any other convenient power may be pressed into service, and the air compressed by any known or convenient means; or compressed air furnished miles away may be employed. The air-conducting pipe E may be rigid or flexible, or either, as circumstances will direct, and, though indicated in some figures of the drawings in a vertical position, is not intended to be always or necessarily vertical, but has usually an inclined position almost horizontal, and in no case is it immediately connected with perforated arms, but always by horizontal pipe or pipes D. The device is not intended to be used in connection with wells or cisterns.

Instead of ordinary air being forced through the pipe system for the purification of the water, air especially oxygenated or ozonized can be used, if compatible with economy, and under certain conditions a more liberal admixture of carbonic-acid gas to the air that it generally contains will prove preferable. Where the floating pipe system is applied in ponds of greatly-varying depth, requiring considerable change in adjusting the hanging of the pipe system, I attach buoys N N to the pipe system—for instance, hollow metal cylinders of such size as to render the whole system but slightly heavier than the water—so as to facilitate the raising and sinking. The hollow cylinders or other buoyant articles in their place are attached to the pipe system below the perforated pipes.

I claim as my invention—

1. A system of pipes in connection with pumps or other means of forcing air and thereby purifying water, which consists in placing the stationary apparatus described near the place of inlet of the water into the reservoir and close to the flow thereof, and capable of being adjusted at a practically uniform level, so that the water becomes saturated with the oxygen of the air uniformly in its course from the inlet into the reservoir, substantially as and for the purposes set forth.

2. The float or floats C, system of perforated pipes M, and means, F E D, for supplying air thereto, in combination with each other and with connecting means J, arranged for joint operation as herein specified.

3. The buoys, in combination with the system of perforated pipes M, suspended to the floats C, means for supplying air to the latter, and means for raising and lowering the system by adjusting it relatively to the float or floats C, substantially as herein specified.

In testimony whereof I have hereunto set my hand, at New York, in the county and State of New York, this 15th day of September, 1883, in the presence of two subscribing witnesses.

R. D'HEUREUSE.

Witnesses:
CHARLES R. SEARLE,
WM. C. DEY.